United States Patent [19]

Brennan

[11] Patent Number: 4,905,438
[45] Date of Patent: Mar. 6, 1990

[54] SPLASHBOARD ASSEMBLY AND METHOD

[76] Inventor: Stephen Brennan, 204 Andover Sparta Rd., Newton, N.J. 07860

[21] Appl. No.: 130,607

[22] Filed: Dec. 9, 1987

[51] Int. Cl.$^4$ ............................................. E04F 19/04
[52] U.S. Cl. ........................................ 52/287; 52/278; 52/718.1; 4/592; 4/595; 248/221.4
[58] Field of Search ................. 52/282, 278, 287, 288, 52/34, 35, 36, 716–718, 290, 280, 741; 4/592–595; 248/221.4, 345.1

[56] References Cited

U.S. PATENT DOCUMENTS

| 2,324,654 | 7/1943 | Tinnerman . | |
|---|---|---|---|
| 2,328,651 | 9/1943 | Kern | 52/718 X |
| 2,887,739 | 5/1959 | Bensman | 52/287 |
| 3,007,213 | 11/1961 | Hobbs | 52/288 |
| 3,270,474 | 9/1966 | Driggers . | |
| 3,293,815 | 12/1966 | Waldron . | |
| 3,298,147 | 1/1967 | Haberman | 52/287 |
| 3,365,854 | 1/1968 | Gallo | 52/716 |
| 3,422,584 | 1/1969 | Howard . | |
| 3,521,419 | 7/1970 | Fornells . | |
| 3,667,177 | 6/1972 | Biela | 52/287 X |
| 3,809,799 | 5/1974 | Taylor . | |
| 4,161,853 | 7/1979 | Weiss . | |
| 4,450,605 | 5/1984 | Schaty . | |
| 4,610,120 | 9/1986 | Canavesi . | |
| 4,691,392 | 9/1987 | Whitney | 52/718 X |

FOREIGN PATENT DOCUMENTS

| 2049301 | 10/1979 | Fed. Rep. of Germany | 52/287 |
|---|---|---|---|
| 36570 | 1/1967 | Finland | 52/287 |
| 675798 | 2/1930 | France | 52/717 |
| 1312799 | 11/1962 | France . | |
| 1574827 | 9/1980 | United Kingdom | 52/287 |

Primary Examiner—Richard E. Chilcot, Jr.
Attorney, Agent, or Firm—Thomas L. Adams

[57] ABSTRACT

A splashboard assembly for mounting upon a countertop and against a vertical wall. The assembly includes a splashboard and a clip. The clip has an upper and lower portions, and can couple the splashboard to the countertop adjacent said vertical wall. The lower portion has a fastening arrangement for fastening the lower portion to the countertop. The upper portion has support devices for supporting the splashboard. The clip has a section for biasing the splashboard against said vertical wall with respect to said countertop. One, or more, clips are first attached to the countertop edge. When the countertop is in place, the splashboard is snapped onto the clips. A decorative end cap may also be provided to cover any exposed end of the splashboard.

15 Claims, 2 Drawing Sheets

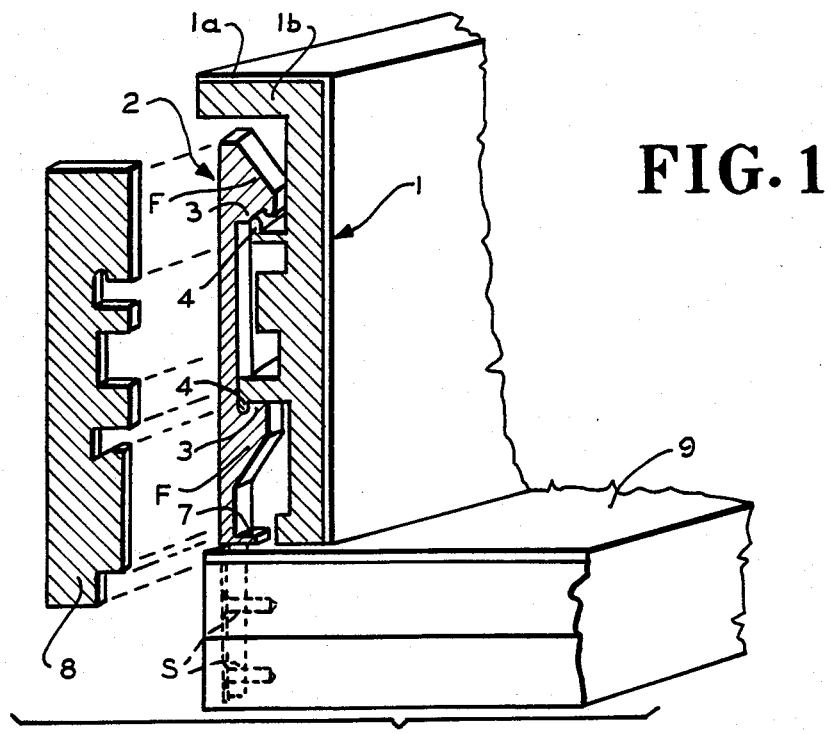
FIG. 1
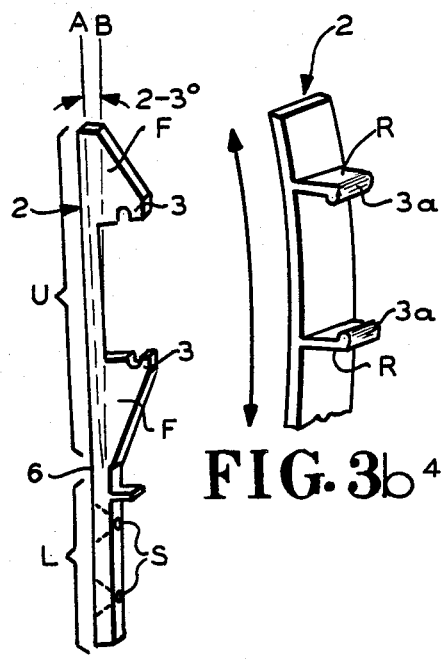
FIG. 3a
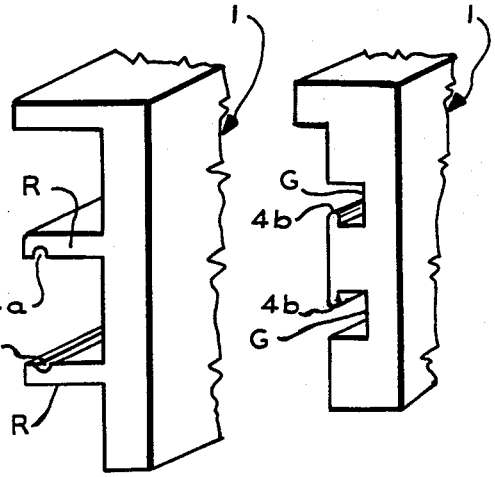
FIG. 2a  FIG. 2b
FIG. 3b

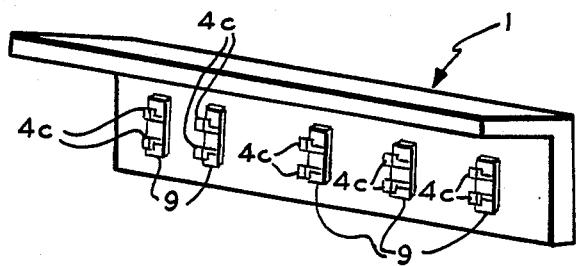
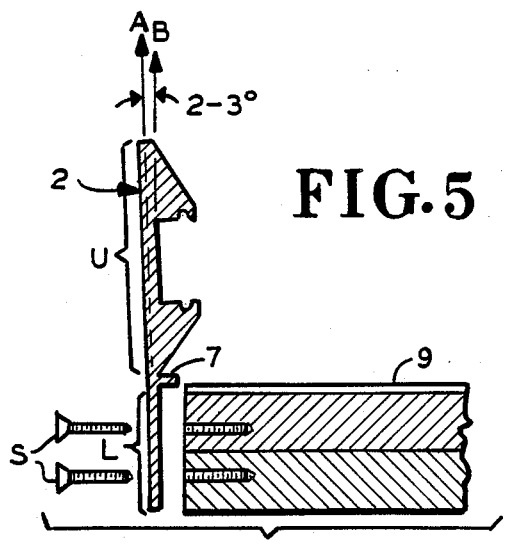
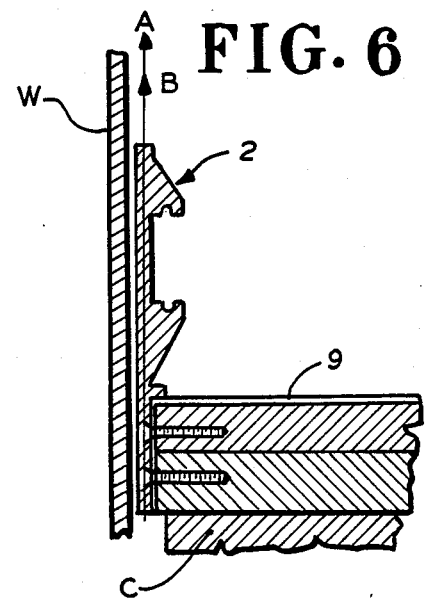
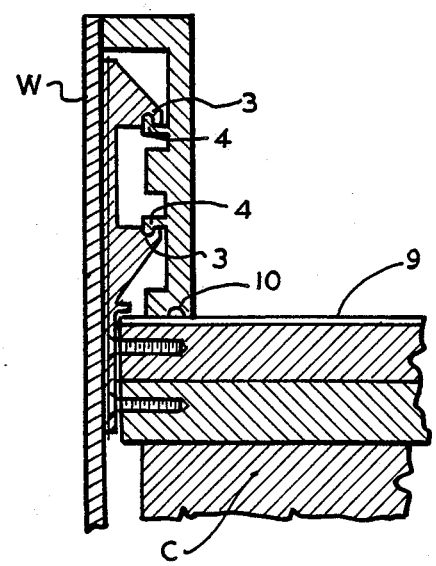

SPLASHBOARD ASSEMBLY AND METHOD

BACKGROUND OF THE INVENTION

The present invention relates to a novel splashboard assembly for a countertop and a method of installing the same.

Conventionally, countertops having splashboards are installed using one of two general methods. In the first method, the countertop is placed onto the cabinet. The splashboard, then, is bonded to the wall. While caulking is usually applied along the countertop where the boards join, leakage often occurs at this point. In time, the wall and cabinet expand at different rates, thereby breaking this seal.

In the second method, the splashboard is formed integral with, or is otherwise attached to the countertop prior to installation. While leaking is prevented, installation limitations are introduced when the distance between opposing walls is greater at the back of the counter than at the front, since the degree to which the counter may be tilted from side to side is dependent on its height.

Accordingly, there is a need for a separate splashboard assembly which will provide the sealing benefits heretofore found only with integral splashboard and countertop units and which can be easily installed regardless of surrounding structural limitations.

SUMMARY OF THE INVENTION

In accordance with the illustrative embodiments demonstrating features and advantages of the present invention, there is provided a splashboard assembly for mounting upon a countertop and against a vertical wall. The assembly has a splashboard and a clip. The clip has upper and lower portions. The clip can couple the splashboard to the countertop adjacent the vertical wall. The lower portion of the clip has a fastening means for fastening the lower portion to the countertop. The upper portion of the clip has a support means for supporting the splashboard. The clip has a biasing means for biasing the splashboard against the vertical wall with respect to the countertop.

In a related method according to the principles of the same invention a splashboard can be mounted to an edge of a countertop, and against a vertical wall, with a clip arranged to be snapped onto the splashboard. The method includes the step of fastening the clip to the edge of a countertop to project partially above the countertop. Another step is installing the countertop at a desired location adjacent a vertical wall. The method also includes the step of snapping the splashboard onto the clip after the countertop is installed.

In a preferred embodiment, the splashboard has a pair of rear rails that snap into concavities on the clips. The clips are F-shaped with fingers projecting outwardly. The upper portion of the preferred clip connects to the splashboard and the lower portion connects to the countertop. The fingers have the concavities that engage the rails.

The clip is formed with a bias to urge the top of the clip against the wall when the lower portion of the clip is fastened to the rear edge of a countertop. An alignment stop, which is spaced apart from the fingers serves to position the clip relative to the countertop by engaging the top surface thereof.

The preferred method of installing the novel splashboard assembly involves first fastening the rear edge of the countertop. Then the unit is placed over a cabinet, or similar structure. The splashboard is pressed against the clip until the clip fingers engage the engaging means on the splashboard. The bias means in the clip urges the splashboard against the wall. The use of this splashboard assembly and method of installation will allow a countertop to be easily installed between opposing walls where their angles require the countertop to be tilted sideways, for, as an example, when the distance between them is greater toward the back of the counter than at the front.

In addition, this splashboard assembly may be used with the convenience of two-step arrangements without the long-term destructive effects of water seepage, since the splashboard is finally attached to the countertop, and not to a wall which expands at different times and rates. Furthermore, by forming the clips with a bias, it is assured that the splashboard will be pressed against the wall whether or not the countertop is perfectly normal to the plane of the wall, or, in the case of a long cabinet, the one end is slightly out of alignment with the other.

BRIEF DESCRIPTION OF THE DRAWINGS

The above summary of the invention, as well as other objects, features and advantages of the present invention will be more fully appreciated by reference to the following detailed description of presently preferred, but nonetheless, illustrative embodiments in accordance with the present invention when taken in conjunction with the accompanying drawings wherein:

FIG. 1 shows an end view illustrating the preferred embodiment of the invention, being fully assembled except for the end cap, which is detached to allow the arrangement of the elements to be viewed;

FIG. 2a shows an end view of a splashboard having an alternate engaging means comprised of rails with concavities;

FIG. 2b shows an end view of a splashboard having, yet, another engaging means comprised of grooves having convexities;

FIG. 3a shows a side view of the clip comprising the preferred embodiment of the invention;

FIG. 3b shows the upper portion of an alternative design for the clip having rails with convexities for engaging the splashboard and an arch to create a bias when installed against a wall;

FIG. 4 shows a rear view of a conventional splashboard equipped with latching elements enabling it to engage the upper portion of the clip of the subject invention as the lower portion of the clip is attached to the countertop;

FIG. 5 illustrates the first step of the method of installing the splashboard assembly as the countertop is placed against a wall;

FIG. 6 illustrates another step of the method of installing the splashboard assembly as the splashboard is engaged with the clip;

FIG. 7 illustrates the final step of the method of installing the splashboard assembly as the splashboard is fastened to the clips.

DETAILED DESCRIPTION OF THE PREFERRED EMBODIMENT

Referring to FIGS. 1, 2a, 2b, 3a, and 3b, a clip 2 is shown having upper U and lower L portion. The upper portion U is formed so that its longitudinal axis, as represented by the line labelled A, is slightly out of alignment with that of the lower portion L, whose longitudinal axis is represented by the arrow labelled B. The purpose for this misalignment is to create a bias in the clip 2 after the lower portion L of the said clip 2 has been attached to the edge of a countertop 9, and after the same has been placed against a wall. This bias ensures that the splashboard 1, which subsequently engages the clip 2, will be urged against the wall.

As a series of clips 2 are placed about the length of the countertop 9, the splashboard 1 will be urged against the wall at each of these points. If the wall is inclined slightly out of the plane normal to the countertop 9 at some point, the clip 2, or clips, used at this point will tend to bend the splashboard 1 to conform the same thereto. Dealing with this situation has been a particular frustration to builders involved in the renovation of homes built before the use of wallboard, or plasterboard. Quite often, a countertop 9 having an integral splashboard 1 will be installed in a room where the plane of the walls deviate from the plane normal to that of the countertop 9 at one end of the splashboard 1. This requires the additional step of installing a shimming element to bridge this gap. Usually, these shimming elements are formed on site from scrap materials or putty, neither of which are aesthetically appealing.

FIGS. 3a and 5 show the degree of longitudinal misalignment of upper U and lower L portions to be between two and three degrees. This insures that the splashboard 1 will rest flush against the wall W when the latter is as much as six degrees out of the normal plane to the countertop 9 from one end to the other. Means for providing the misalignment may take any of several forms. In the preferred embodiment, a straight upper portion U is integrally attached to a straight lower portion L at point 6, which appears as a bend. Alternatively, this misalignment may take the form of an arcuately bent upper portion U as seen in FIG. 3b. Since other possible designs exist for forming the misalignment means, it is understood that this invention does not limit itself to the preferred and alternative embodiments, but broadly encompasses any means of forming a clip 2 which will create a bias when attached to a countertop 9 and placed against a wall W for the purpose of urging a splashboard 1 there against. The clip 2, in the preferred embodiment has been stamped from a piece of plastic. The same may be injection molded, or the like. Alternatively, the clip 2 may be stamped from metal so that the bend 6 would be formed during the stamping operation. To the upper portion U of the clip 2 are formed extending fingers F having concavities 3 which are designed to engage convexities 4 formed on rails R attached to the rear of the splashboard 1. The plastic material, from which the clip 2 is made, affords the same with a degree of resilience so that the fingers F will spread as the convexities 4 on the rails R are forced there between. FIG. 3b illustrates an alternative clip 2 design having a broader width to accommodate rails R in place of fingers F. The rails may be formed with either concavities or convexities. In this figure, they are formed with convexities 3a which would correspond to engaging means on the rear of the splashboard having concavities. The clip 2 further comprises means 7 for aligning the same with respect to the countertop 9. In the preferred embodiment, the alignment means 7 is comprised of a small extension of plastic forming a tab which engages the top of the countertop. This ensures that each clip will be precisely in vertical alignment with respect to the countertop. Alternatively, the alignment means may comprise a vertical extension from the lowermost finger F. The present invention does not limit itself to a specific means for achieving alignment of the clips 2 with respect to the countertop 9, but broadly encompasses any clip structure which, when attach to a countertop 2, would produce the desired result.

The rails R in FIG. 4a with concavities 4a comprise engaging means for engaging the fingers F formed on the upper portion U of the clips 2. These means are to correspond, or mate with whatever configuration is selected for the engaging fingers F formed on the upper portion U of the clip 2. In this drawing, the rails mate with fingers having convexities. In place of rails, the splashboard may be provided with grooves having mating concavities or convexities as seen in FIG. 2b. This design might simplify manufacturing and eliminate the possibility of being damaged by the fingers F during installation. The grooves G would be formed with mating convexities or concavities. In this case, the rails R are formed with convexities 4a, which would correspond with fingers having concavities. It might be desired to utilize the splashboard assembly of the present invention with existing splashboards which were manufactured without rails or grooves. This would be possible with the use of latching elements 9 as shown in FIG. 4. These latching elements might take any of several forms. In the embodiment shown in FIG. 4, these latching elements 9 are fastened to the rear of the splashboard 1 in spaced relation to each other. Latching means 4c engage corresponding fingers F or rails R formed on the upper portion U of the clip 2. In this figure, the latching means comprises convexities, which would mate with concavities formed on the fingers F of a clip 2.

A particular advantage of the present invention resides in the method of assembling the splashboard 1 to a countertop C, which provides the sealing advantages of integrally attached splashboard and countertop units with the installation flexibility of separate units. This method is illustrated in FIGS. 5 through 7. FIG. 5 shows the first step, as the clip 2 lower portion is being attached to the countertop 9 by screws S. An alignment means 7 on each clip 2 engages the top surface of the countertop 9 to ensure relative alignments there between. In this preferred embodiment, the straight upper portion U is out of longitudinal alignment with the lower portion L. This can be seen by the lines A and B. The longitudinal axis of the upper portion U, indicated by line A, is two or three degrees out of alignment with that of the lower portion U, which is indicated by line B. FIG. 6 shows the second installation step, as the clip 2, and countertop 9 are placed onto a cabinet C and against a wall W. The wall W substantially straightens the clip 2 so that a bias is formed in the upper portion U to urge the same toward the wall. In this case, the wall is in a plane perfectly normal to that of the countertop. This is seen in the fact that the longitudinal axis of the upper portion U, indicated by line A, is in alignment with that of the lower portion L, indicated by line B. The third and final step is illustrated in FIG. 7, where the splashboard is pressed against the clips until the fingers F on the upper clip portion U engage the engaging means 4 on the rear of the same. At this point, the splashboard 2 will be securely fastened to the wall W along its entire length regardless of whether or not the wall W deviates from the plane normal to that of the countertop 9. The alignment means 7 ensures that the lower edge of the splashboard 1 rests evenly along the top of the countertop 9.

Several methods may be employed to seal the joint between the countertop 9 and splashboard 1. One method would be to install commercially available, adhesively attached strips along the outer length thereof. This method would provide a lasting seal since the problems experienced with the differing expansion rates of the splashboard 2 and countertop 9 with known two-part arrangements is eliminated by virtue of the fact that these parts are effectively attached to each other. Alternatively, and as represented in FIG. 7, the bottom of the splashboard may further comprise a groove 10 which would be of sufficient depth to receive an appropriate amount of caulking prior to attaching the same to the clips. This latter sealing method provides a more aesthetic overall appearance.

To further enhance the overall appearance of the assembly, closure means may be provided for sealing the exposed ends of the splashboards 1 and for obscuring the inner elements thereof. The closure means may take any of several forms. In the preferred embodiment, as seen in FIG. 1, the closure means is comprised of a plastic plate 8, which is shaped to correspond to the shape of the cross-section of the splashboard 1. After the splashboard 1 is fully assembled, the plastic plate 8 is pressed onto the exposed end thereof until the two are flush with each other. The present invention does not limit itself to any specific form of closure means, but broadly encompasses any means for aesthetically sealing the exposed end of the splashboard 1 for obscuring the inner elements thereof and might include plates or other decorative means which cover fully the end of the splashboard 1.

Backsplash 1 may be formed a plastic extrusion 1b that is prelaminated or has a laminate 1a installed at the site. The laminate may be Formica TM. In some embodiments there need not be a laminate, but the backsplash will have a continuous color throughout (Color-core TM). In any event, it is advantageous to have the laminate secured in advance to reduce installation time and expense. While a plastic backsplash is described in some embodiments, a layered construction or non-plastic material may be used instead.

It is to be appreciated that various modifications and variations of the present invention are possible in light of the above teachings. It is therefore to be understood that, within the scope of the appended claims, the invention may be practiced otherwise than specifically described.

What I claim is:

1. In a countertop assembly, a splashboard assembly for mounting upon a countertop and against a vertical wall, comprising:
   a splashboard; and
   an aligned plurality of spaced clips each having upper and lower portions, for coupling said splashboard to said countertop adjacent said vertical wall, each of said lower portions having
   fastening means for fastening said lower portions to said countertop, each of said upper portions having support means connecting to said splashboard, each of said clips having biasing means for biasing said splashboard against said vertical wall with respect to said countertop, each of said upper portions having
   snap means for positively grasping and vertically supporting said splashboard in response to said splashboard being horizontally thrust against said snap means.

2. A splashboard assembly, as claimed in claim 1 wherein said support means is operable to provide socketed support of said splashboard.

3. A splashboard assembly, as claimed in claim 2, wherein said clips has an alignment stop projecting from said clips for engaging an edge of said countertop.

4. A splashboard assembly, as claimed in claim 1, wherein said splashboard has two ends and further including:
   a cap for decoratively sealing each of the two ends of the splashboard.

5. A splashboard assembly, as claimed in claim 4, wherein said support means comprises:
   at least one pair of fingers projecting toward said splashboard and making a socketed connection thereto.

6. A splashboard assembly, as claimed in claim 1, wherein said splashboard comprises:
   at least one pair of fingers projecting toward said clips and making a socketed connection thereto.

7. A splashboard assembly, as claimed in claim 6, wherein said fingers have opposing concavities.

8. A splashboard assembly, as claimed in claim 7, wherein said splashboard comprises a spaced pair of convexities engaging said concavities.

9. A splashboard assembly, as claimed in claim 7, wherein said splashboard comprises a pair of rails having convexities engaging said concavities.

10. A splashboard assembly, as claimed in claim 4, wherein said upper portion is at an obtuse angle with respect to said lower portion.

11. A splashboard assembly, as claimed in claim 4, wherein said upper portions have an arcuate bend.

12. A splashboard assembly, as claimed in claim 10, wherein said splashboard includes grooves formed in a surface of said splashboard.

13. A method of mounting a splashboard to an edge of a countertop, and against a vertical wall, with a clip arranged to be snapped to said splashboard, said clip having an upper portion with a snap means for positively grasping and vertically supporting said splashboard in response to said splashboard being horizontally thrust against said snap means, comprising the steps of:
   fastening said clip to the edge of a countertop to project partially above said countertop;
   installing said countertop to a desired location adjacent a vertical wall; and
   snapping said splashboard onto said clip after said countertop is installed by horizontally thrusting said splashboard against said snap means to allow it to grasp and vertically support said splashboard.

14. A method, as claimed in claim 13, further including the step of:
   mounting said clips at an obtuse angle with respect to the top of said countertop, whereby a bias is created to urge said splashboard against said wall after said splashboard is coupled to said clips.

15. A method, as claimed in claim 13, wherein said wall is an alcove or concavity and including the step of:
   installing said countertop by tilting it as it is fitted into said alcove or concavity; and
   leveling said countertop.

* * * * *